Dec. 18, 1934.  J. P. KOENIG  1,984,834
PIPE PUSHING TOOL
Filed Nov. 4, 1933
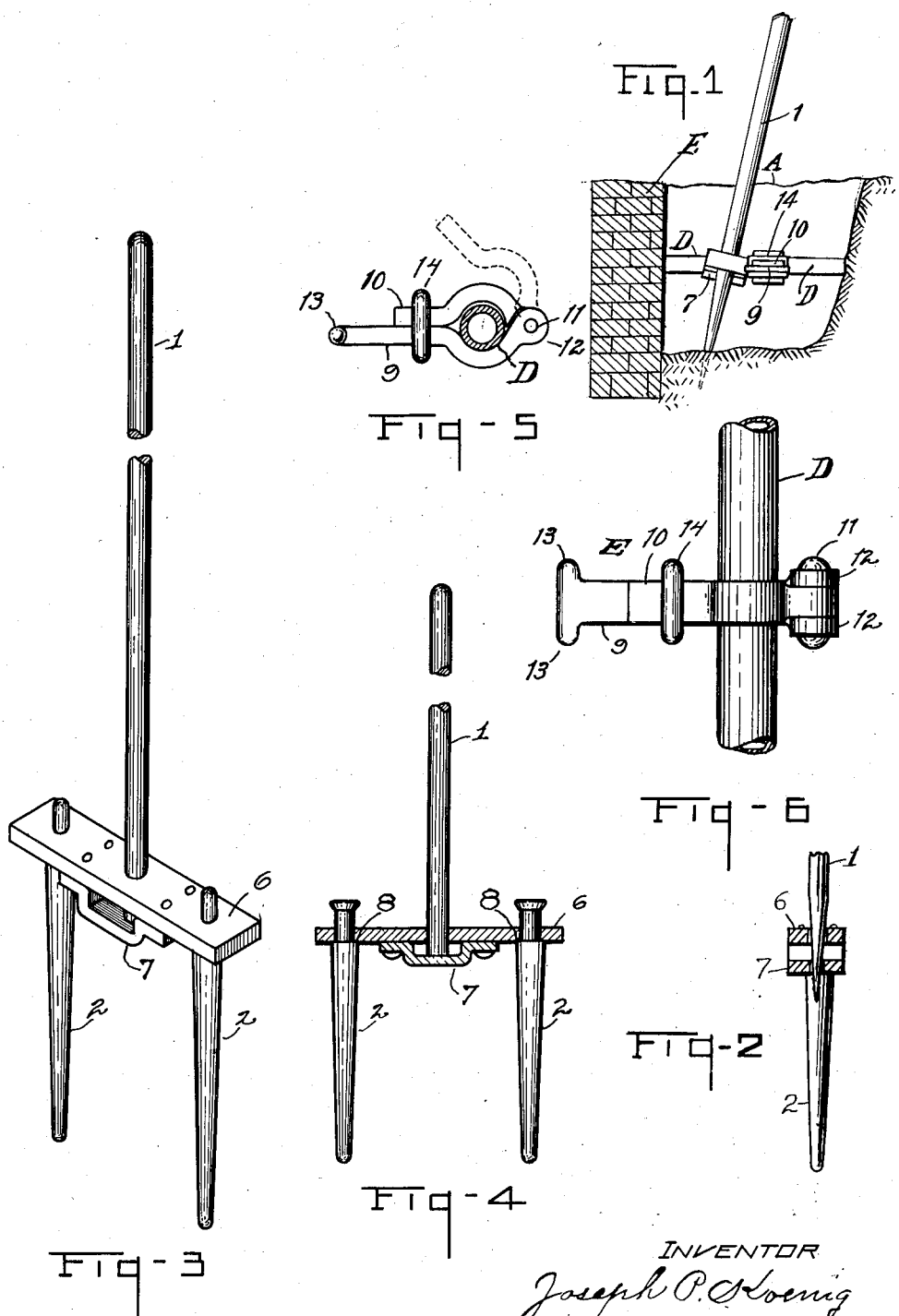
INVENTOR
Joseph P. Koenig
By Victor E. Randall
Atty.

Patented Dec. 18, 1934

1,984,834

UNITED STATES PATENT OFFICE 1,984,834

PIPE PUSHING TOOL

Joseph Peter Koenig, Kalamazoo, Mich.

Application November 4, 1933, Serial No. 696,647

5 Claims. (Cl. 254—29)

This invention relates to tools for placing pipes for conducting gas, water and other fluids, electric wiring etc: by means of forcing said piping through the ground.

An object of the invention is to more readily facilitate the placing of underground tubular conduits, for connecting with pipes, mains, or other sources wherein a junction of the parts is to be effected.

An important object of the invention is to provide means whereby excavating, for the most part, trenching for the laying of pipe, the uprooting of shrubbery, and despoiling of lawns and flower beds caused by excavating and its attendant litter will be eliminated and whereby expense for trenching and replacement of debris will be eliminated.

Another object of the invention is to more readily and quickly place a line of piping for the purposes outlined than has heretofore been accomplished. These and other objects and advantages will be more fully comprehended by artisans in general, and by trenchmen, pipe setters, and plumbers in particular when taken in connection with the accompanying drawing, wherein, Fig. 1 shows a section of a working excavation next to a basement or cellar wall, and a longitudinal view of a pipe section with my improved pipe pushing tool in operative position, the arrow indicating the movement of the tool and pipe.

Fig. 2 is a cross-section of a slightly modified form of the tool.

Fig. 3 is an assembled perspective of the tool.

Fig. 4 is a side view of the assembled tool partly in section.

Fig. 5 is a cross-section of a pipe with my pipe gripping dog attached, the dotted lines at the upper portion, indicating an upper hinged jaw of the dog elevated to release the pipe, and it also shows the clip link, in dotted lines, moved to release said upper jaw, and Fig. 6, is a plan view of the dog attached to a pipe.

In the drawing like marks of reference refer to corresponding or equivalent parts in the different views, in which, A represents an excavation in a body of earth B, with C designating the bottom of said excavation, adjacent which is the cellar wall E, and D a pipe, the latter of which, in Fig. 1, is being forced through said earth by means of my improved pipe forcing tool.

Assuming that it was desired to install a hydrant, bath fixture or other apparatus necessitating flowing water into a house from a main source of supply, and to do so would necessitate the laying of a pipe from said main to said house in near proximity thereto, and the soil through which pipe was to be placed was gravel or loose loam, or a mixture of the two, or equivalent material, and the house above referred to, was standing on a basement or cellar wall as shown in Fig. 1, in which instance, a hole as 5, is made in the wall E, near the bottom thereof and to one side of the center of the excavation. This excavation, or pit should be of a size sufficiently large to permit a workman to stand and oscillate, or work the handle member 1, of the tool, back and forth as the dog, is advanced with the pipe D, it being understood that said dog is to be slid back to a working position by hand, after a forward working thrust of said handle has been made thereagainst. The handle member aforesaid projects from a cross-bar or plate 6. This plate at its center and under side, has a retaining guard 7, the major portion of which, lies parallel with said plate, its ends being bent to engage the plate and riveted or otherwise attached thereto. The handle aforesaid is fitted through a center hole of the plate and seats on the guard aforesaid, the main object of the plate being to form a locating seat for said handle to be operated from. Near each end of the plate a hole is formed and carried in these holes anchor spikes 2 are placed. Preferably, these spikes are formed with shoulders 8, which abut the bar or plate 6, from its under side to assist in keeping the assembled parts in proper relation with one another when in working position. In Fig. 4 is shown a modification of the spikes, in which, said spikes have slightly flattened heads for preventing the same from becoming detached from the plate 6, when the tool is being operated in very loose ground, as by the broadened surface of the plate resting on the bottom of a pit or excavation, the tool is precluded from settling beyond a working position, and even so, it requires very little attention at the hands of the operative to retamp the earth beneath said tool and proceed with his work. A slightly modified form of the tool is shown in Figure 2 wherein the handle 1 is provided with a pointed end while the rest or guard plate 7 is provided with a relatively small opening in comparison to the opening in the bar 6, so that the pointed end of the handle can wedge into the plate 7 after insertion through the bar 6.

So far, I have described the construction of the tool for forcing the dog and its attachment with a pipe into the ground, I will now set forth the construction and operation of the improved dog used in connection with the pushing tool.

This dog comprises two curved members 9 and 10, hinged near their curved portion on a pintle 11, one of the members having two ears 12, the other member seating therebetween, as shown in Fig. 6. The member 9 is somewhat longer than its hinged member 10, and at its free end is provided with oppositely disposed lugs, or stops 13, which are for the purpose of preventing the locking link or band 14, from dislodgement from said dog. This link, when the dog is folded to encompass a pipe as shown in Figs. 5 and 6, is moved forward or toward said pipe, to engage both wings of said dog and prevent its curved jaws from opening when the dog is in operative position about a pipe.

The hinged members of the dog, may be rectangular in cross-section, or may be made to deviate therefrom, as expedient, and in operative practice it is not necessary that the members tightly impress a pipe to which it is attached, in as much as when leverage is brought to bear against the folded together ends between the clip, or link 14, and the pipe being pushed into the ground, the angularity of the dog on the pipe caused by said pushing strain will cause diagonally opposite portions of said dog to bite the pipe sufficiently tight to carry the pipe along with the same, a relinquishing of stress against said dog, permitting the same to be brought rearwardly and into working position again, the process, together with impressing the handle member of the tool aforesaid, against said dog being repeated, until the pipe is forced to a position where desired, the dog being disposed on the pipe to the right of the plate 6 in Figure 1 so that the pressure against the same by the plate being forced against the same will cause the necessary driving action of the pipe through the earth.

As shown, the pipe at its forward, or driven end, is fitted with a rectangular elongated plug 16. Experience in forcing piping through various soils, in the manner hereinbefore set forth, has proven that to get a straight, or nominally straight course with a pipe, a square sectioned plug with a blunt end effects a better result than with plugs having sharp, or beveled points, for the reason, that where small obstructions are encountered in the soil with a square ended plug, said plug will gradually force said obstruction to one side without deflecting the course of said plug and its attached pipe, whereas, with points of various sharp or beveled ends, such points are apt to be deflected from a straight course and lead the pipe to which they are attached to one side, and often times signally fail to accomplish the desired end.

It will be observed that Figure 2 is slightly different in construction from Figures 3 and 4 in that the handle 1 is tapered at its lower end and not only extends through the plate 7 but also into an opening in the guard plate 7. The tapered ends are preferably wedged in the openings in the guard plate 7.

From the foregoing description, taken in connection with the accompanying drawing, a more extended explanation of the uses, objects, and advantages of my invention is believed to be unnecessary.

Having therefore described my invention, what I claim as new and desire to secure by Letters Patent is:—

1. In a device of the class set forth, a crossbar having alined holes therethrough, a handle member removably mounted in a central hole of said bar, a guard disposed below said central hole and secured at its ends to said bar, said handle member adapted to rest on said guard when located in said central hole, spikes disposed on each side of said handle member from the opposite side of said crossbar.

2. In a device of the class set forth, a metallic crossbar rectangular in cross section and provided with three alined holes central of its broader dimension, a guard depending from said bar below a central hole thereof, a handle member portably mounted in said central hole and seating on said guard, spikes having extensions at their upper ends and formed with shoulders adapted to abut said bar from its under side and opposite said handle when said extensions are placed into the other of said holes.

3. A pipe driver comprising a handle, a cross bar at one end of the handle, and a pair of ground-engaging spikes projecting from said bar and upon which the bar and handle can fulcrum in engaging and driving a pipe.

4. A pipe driver comprising a handle, a cross bar at one end of the handle, a pair of ground-engaging spikes projecting from said bar and upon which the bar and handle can fulcrum in engaging and driving a pipe, and means slidably connecting the spikes to said bar.

5. A pipe driver comprising a handle, a cross bar at one end of the handle, and a pair of ground-engaging spikes projecting from said bar and upon which the bar and handle can fulcrum in engaging and driving a pipe, said bar being provided with an intermediate opening for removably receiving the end of the handle, and a guard plate secured to the bottom of the bar and against which the said handle end can engage.

JOSEPH PETER KOENIG.